(12) United States Patent
Enenkel

(10) Patent No.: US 9,112,405 B2
(45) Date of Patent: Aug. 18, 2015

(54) VOLTAGE CONVERTER WITH STEP-DOWN CONVERTER CIRCUIT AND METHOD FOR CONVERTING VOLTAGE

(75) Inventor: Jan Enenkel, Gratkorn (AT)

(73) Assignee: ams AG, Unterpremstaetten (AT)

( * ) Notice: Subject to any disclaimer, the term of this patent is extended or adjusted under 35 U.S.C. 154(b) by 91 days.

(21) Appl. No.: 13/320,473

(22) PCT Filed: Apr. 29, 2010

(86) PCT No.: PCT/EP2010/055857
§ 371 (c)(1),
(2), (4) Date: Mar. 1, 2012

(87) PCT Pub. No.: WO2010/130588
PCT Pub. Date: Nov. 18, 2010

(65) Prior Publication Data
US 2012/0249096 A1 Oct. 4, 2012

(30) Foreign Application Priority Data
May 11, 2009 (DE) .......................... 10 2009 020 834

(51) Int. Cl.
*G05F 1/00* (2006.01)
*H02M 3/07* (2006.01)
*H05B 33/08* (2006.01)

(52) U.S. Cl.
CPC .............. *H02M 3/07* (2013.01); *H05B 33/0818* (2013.01); *Y02B 20/346* (2013.01)

(58) Field of Classification Search
USPC ......... 323/225, 266, 268, 271, 282, 351, 350; 363/59, 60; 307/109, 110
See application file for complete search history.

(56) References Cited

U.S. PATENT DOCUMENTS

| | | | | |
|---|---|---|---|---|
| 6,753,623 B2* | 6/2004 | McIntyre et al. | ............. | 307/109 |
| 7,235,954 B2* | 6/2007 | Murakami | ..................... | 323/222 |
| 2004/0041620 A1 | 3/2004 | Angelo | | |
| 2008/0122505 A1 | 5/2008 | Wu | | |
| 2008/0157732 A1* | 7/2008 | Williams | ...................... | 323/266 |

(Continued)

FOREIGN PATENT DOCUMENTS

| | | |
|---|---|---|
| DE | 10 2005 030 123 | 1/2007 |
| DE | 10 2007 014 384 | 10/2008 |

(Continued)

OTHER PUBLICATIONS

"Data Sheet for AS3658", available from austriamicrosystems USA, Inc.

*Primary Examiner* — Adolf Berhane
*Assistant Examiner* — Alex Torres-Rivera
(74) *Attorney, Agent, or Firm* — McDermott Will & Emery LLP

(57) ABSTRACT

A voltage converter comprises a step-down converter circuit (DCDC) with an inductive accumulator (LSW) and a first capacitive accumulator (CDC) and a charge pump circuit (CP) with at least one second capacitive accumulator (CFLY, CFLY1,CFLY2). The step-down converter circuit (DCDC) which can be fed a supply voltage (VBAT) on the input side is designed to charge the first capacitive accumulator (CDC) to a first intermediate voltage in switched mode. The charge pump circuit (CP) is designed to charge the at least one second capacitive accumulator (CFLY, CFLY1,CFLY2) to a second intermediate voltage using the supply voltage (VBAT) and to generate an output voltage from the first and second intermediate voltages.

15 Claims, 4 Drawing Sheets

(56) References Cited

U.S. PATENT DOCUMENTS

2008/0158915 A1* 7/2008 Williams .................. 363/21.06
2009/0102439 A1    4/2009 Williams
2009/0167260 A1* 7/2009 Pauritsch et al. ............. 323/233
2010/0181973 A1    7/2010 Pauritsch et al.

FOREIGN PATENT DOCUMENTS

EP          1 499 165        1/2005
WO     WO 2007/074866        7/2007

* cited by examiner

VOLTAGE CONVERTER WITH STEP-DOWN CONVERTER CIRCUIT AND METHOD FOR CONVERTING VOLTAGE

RELATED APPLICATIONS

This application is a U.S. National Phase Application under 35 USC 371 of International Application PCT/EP2010/055857 filed Apr. 29, 2010.

This application claims the priority of Germany application No. 10 2009 020 834.8 filed May 11, 2009, the entire content of which is hereby incorporated by reference.

FIELD OF THE INVENTION

The invention relates to a voltage converter and a method for voltage conversion.

BACKGROUND OF THE INVENTION

Voltage converters are widely used in order to convert supply voltages into higher operating voltages. This is especially helpful in mobile radio devices if higher voltages are required than the voltage provided by the battery of the mobile radio device.

Such voltage converters have, for instance, a coil and a capacitor, which are charged with energy from the supply voltage in switched mode. Energy is typically transferred into the coil in one switching phase, while energy is transferred from the coil to the capacitor in another switching phase. Consequently, all the energy that is required at the output of the voltage converter is interim-stored in the coil. This influences the necessary size of the coil used, which in turn affects the production costs for the voltage converter.

SUMMARY OF THE INVENTION

It is therefore an objective of the invention to provide a voltage converter and a method for voltage conversion that allow a more economical voltage conversion.

In one embodiment, a voltage converter comprises a step-down converter circuit having an inductive accumulator and a first capacitive accumulator, and a charge pump circuit connected downstream of the step-down converter circuit. A supply voltage can be fed to the step-down converter circuit on the input side. The step-down converter circuit is designed to charge the first capacitive accumulator to a first intermediate voltage in switched mode. The charge pump circuit is designed to charge at least one second capacitive accumulator to a second intermediate voltage using the supply voltage and to generate an output voltage from the first and second intermediate voltages.

Accordingly, an output voltage that is composed of first and second intermediate voltages is generated with the described voltage converter. Consequently, one part of the energy that is required at the output of the voltage converter is transferred directly from a supply voltage input to the second capacitive accumulator, implemented as a capacitor for example, in the charge pump circuit. Another part of the energy required at the output is transferred in the step-down converter circuit via the inductive accumulator to the first capacitive accumulator. Consequently, a smaller inductive accumulator such as a coil can be used in comparison to a conventional solution. Thereby the described voltage converter can be produced more cost-effectively. It must be taken into account that capacitive accumulators are less expensive than corresponding inductive accumulators.

In one embodiment, the step-down converter is designed to charge the inductive accumulator via the supply voltage in a first switching phase, and to transfer energy from the inductive accumulator to the first capacitive accumulator in a second switching phase. The first and second switching phases preferably alternate with one another.

For example, a current flow is effected in the first switching phase from a supply voltage input via the inductive accumulator and the downstream first capacitive accumulator, with which energy is stored in the inductive accumulator. In the second switching phase, the inductive accumulator is disconnected from the supply voltage and connected to the first capacitive accumulator, so that the inductive accumulator discharges via a current and thereby transfers its energy to the first capacitive accumulator.

In another embodiment, the charge pump circuit is designed to charge the second capacitive accumulator to the second intermediate voltage in a third switching phase, and to connect the first and the at least one second capacitive accumulator in series in a fourth switching phase. The third and the fourth switching phases preferably also alternate.

In other words, the second intermediate voltage, by which the first intermediate voltage is to be raised or increased, is generated on the at least one second capacitive accumulator in the third switching phase. Accordingly, the generation of the output voltage by increasing the first intermediate voltage by the amount of the second intermediate voltage takes place in the fourth switching phase.

The first and third switching phases can begin simultaneously in a combination of the described embodiments. Alternatively, the switching periods of the first and second or the third and fourth switching phases, respectively, can be different with respect to length and/or frequency.

The level of the output voltage, or the second intermediate voltage, depends on the number and connection of capacitive accumulators in the charge pump circuit. For example, the charge pump circuit has exactly one second and one third capacitive accumulator, which have substantially the same capacitance, i.e. within manufacturing tolerances. In this case, the charge pump is designed to charge the second and third capacitive accumulators connected in series to the supply voltage in the third switching phase and to connect the second and third capacitive accumulators in a parallel circuit in series with the first capacitive accumulator in the fourth switching phase. This has the effect that the second and third capacitive accumulators are each charged to a voltage that corresponds to substantially one half of the supply voltage. In case of a parallel connection of the second and third capacitive accumulators in the fourth switching phase, half the supply voltage results as the second intermediate voltage, which brings about an increase of the first intermediate voltage by half the supply voltage due to the series connection of the second and third capacitive accumulators with the first capacitive accumulator.

If the charge pump circuit comprises exactly one second capacitive accumulator, it is charged to the supply voltage in the third switching phase. In other words, the second intermediate voltage corresponds to the supply voltage in this case. The output voltage of the voltage converter accordingly results from the sum of the first intermediate voltage and the supply voltage.

In other embodiments, a charge pump circuit with several capacitive accumulators can also be used, in which charging takes place in such a manner that the second intermediate voltage is greater than the supply voltage.

For some embodiments it can be necessary to provide an output voltage at the voltage converter that is smaller than the supply voltage. This can be the case particularly for fluctuating supply voltages such as an initially fully charged battery that provides the supply voltage. Consequently, an increase of the first intermediate voltage, by the supply voltage, for example, is not desired.

Accordingly, the voltage converter in one embodiment comprises a bridge circuit that is designed to connect the first capacitive accumulator to the output terminal of the voltage converter, depending on a control signal, in such a manner that the first intermediate voltage is output at the output terminal as the output voltage. In other words, the bridge circuit or the control signal deactivates a function of the charge pump circuit with respect to increasing the voltage. The output voltage range of the voltage converter is increased by this embodiment, since output voltages in the range from zero to the supply voltage can also be output.

One or more control circuits that output appropriate switching signals are provided in various embodiments to drive the step-down converter circuit and the charge pump circuit. In one embodiment, the step-down converter circuit comprises a control section, for instance, that is designed to control the switched mode in such a manner that the first intermediate voltage has a predetermined value. The predetermined value here can be supplied to the control section in the form of a digital signal or a reference voltage, for example. Control parameters that influence the control process can also be supplied to the control section. In particular, the voltage at the first capacitive accumulator can be evaluated as the control parameter.

In another embodiment, a current source for supplying an electrical load is provided at the output side of the voltage converter. The control section is designed to perform the control as a function of a voltage drop across the current source. For example, regulation in the control section can be done in such a manner that a voltage drop across the current source reaches a reference value. The voltage drop or the corresponding reference value here is a measure of the level of the output voltage that is output by the voltage converter. Accordingly, the value of the first intermediate voltage to be output is increased in case the a voltage drop across the current source is too low, for example.

In one example embodiment of a method for voltage conversion, a step-down converter with an inductive accumulator and a first capacitive accumulator is provided. In addition, a charge pump circuit with at least one second capacitive accumulator is provided. In switched mode, the first capacitive accumulator is charged to a first intermediate voltage by a supply voltage via the inductive accumulator. The at least one second capacitive accumulator is charged to a second intermediate voltage by means of the supply voltage. An output voltage is generated as a function of the first and second intermediate voltages.

In the described method, an inductive accumulator that has a smaller inductivity in comparison to a conventional solution can again be used. Such an inductive accumulator is therefore more cost-effective than a conventional solution and requires less space in the construction of the step-down converter circuit. In different embodiments of the method for voltage conversion, the step-down converter and the charge pump circuit can be operated as described above for the various embodiments of the voltage converter.

In one embodiment of the method, for example, either the first intermediate voltage or the sum of the first and second intermediate voltages is output as the output voltage, depending on a control signal. Thereby the voltage range of the output voltage can be flexibly increased.

BRIEF DESCRIPTION OF THE DRAWINGS

The invention will be described in detail below for several example embodiments with reference to the figures. Elements with identical function or effect bear identical reference numbers.

Therein.

DETAILED DESCRIPTION OF THE DRAWINGS

Figure 1:
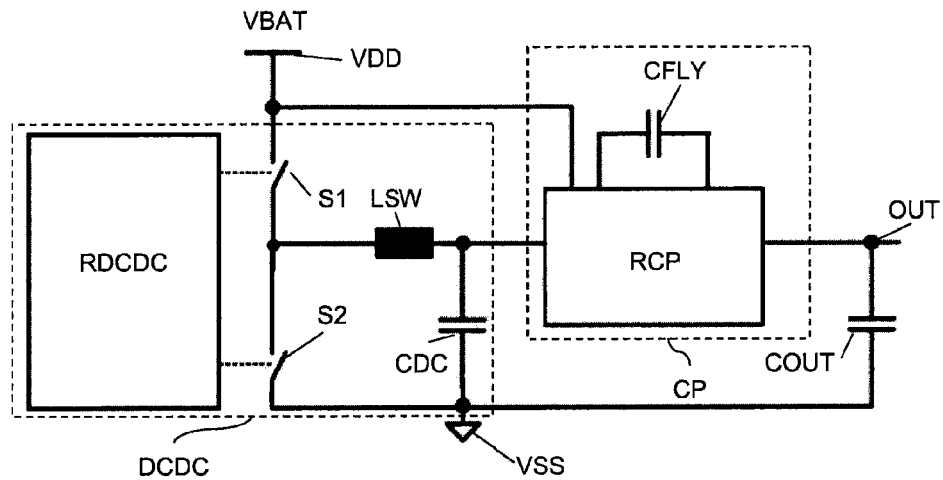
FIG. 1 shows a first example embodiment of a voltage converter.

FIG. 1 shows an example embodiment of a voltage converter with a step-down converter circuit DCDC and a charge pump circuit CP. The step-down converter DCDC comprises an inductive accumulator LSW, which is implemented as a coil for example, and a first capacitive accumulator CDC, which is formed by a capacitor. One terminal of the inductive accumulator LSW is connected via a switch S1 to a supply voltage terminal VDD and via a switch S2 to a reference voltage terminal VSS. The second terminal of the inductive accumulator LSW is connected to the first capacitive accumulator CDC and simultaneously forms an output of the step-down converter circuit DCDC. The first capacitive accumulator CDC is connected between the inductive accumulator LSW and the reference voltage terminal VSS. The first and second switches S1, S2 are controlled by a control section RDCDC of the step-down converter circuit DCDC.

Control section RDCDC can be, for example, power and audio management unit AS3658 available from austriamicrosystems USA, Inc. Only one functional entity would be used, namely the component "DCDC step-down DVM" shown in the manufacturer's data sheet.

The charge pump circuit CP has a control section RCP that is coupled with a first input to the supply voltage terminal VDD and with a second input to the output of the step-down converter circuit DCDC. A second capacitive accumulator CFLY is also connected to the control section RCP. One output of the charge pump circuit CP is connected to an output terminal OUT of the voltage converter. Also shown in FIG. 1 is an output accumulator COUT that is connected between the output terminal OUT and the reference potential terminal VSS. The output accumulator COUT, which essentially is used to stabilize the output voltage, is not a mandatory component of the voltage converter.

The control section RCP can be any 8-bit microcontroller or an FPGA (field programmable gate array). One example of a device that can be used is a PIC24FJ64GB004 microcontroller.

The step-down converter circuit DCDC and the charge pump circuit CP can be operated independently of one another with respect to their control. By appropriate opening and closing of the first and second switches S1, S2 with intermediate storage on the inductive accumulator LSW in the step-down converter DCDC, energy is transferred to the first capacitive accumulator CDC in order to generate a first intermediate voltage at the output of the step-down converter circuit DCDC. A level of the first intermediate voltage depends in a known manner on the respective switching durations of the first and second switches S1, S2.

In the charge pump circuit, the second capacitive accumulator CFLY is charged by means of a supply voltage VBAT at the supply voltage terminal VDD to the value of the supply voltage VBAT, for example. In other words, the second capacitive accumulator CFLY is charged to a second intermediate voltage that corresponds in this case to the supply voltage VBAT. By appropriate connection of several capacitive accumulators in the charge pump circuit CP, second intermediate voltages that are smaller or larger than the supply voltage VBAT can also be generated. This will be explained in more detail below.

When the charge pump circuit CP has generated the second intermediate voltage, it is capable of connecting the second capacitive accumulator CFLY and the first capacitive accumulator CDC, on which the first intermediate voltage is present, in such a manner that an output voltage is present at the output terminal OUT that is composed of the first and second intermediate voltages, for example in an additive manner. The output accumulator COUT is thus charged to this output voltage.

Figure 2:
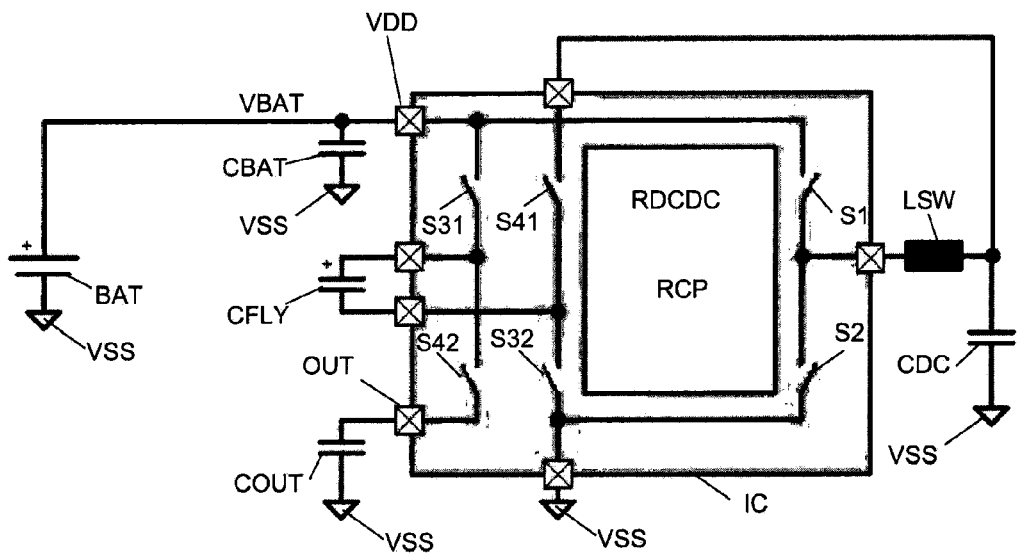
FIG. 2 shows a second example embodiment of a voltage converter.

FIG. 2 shows another example embodiment of a voltage converter, which is at least partly implemented as an integrated circuit IC. The integrated circuit IC comprises the first and second switches S1, S2 as well as additional switches S31, S32, S41, S42. A combined control section RDCDC, RCP is also shown, which is used among other things for controlling the switches. Corresponding control lines from the combined control section RDCDC, RCP for controlling the switches are not shown for reasons of clarity, but are clear to the person skilled in the art without further explanation. A voltage source BAT for providing the supply voltage VBAT is connected to the supply voltage terminal VDD. A capacitive input accumulator CBAT that is connected between the supply voltage terminal VDD and the reference voltage terminal VSS is also provided. As previously described for the example embodiment of FIG. 1, the inductive accumulator LSW can be coupled via the first and second switches S1, S2 alternatively to the supply voltage terminal VDD or the reference voltage terminal VSS. The other terminal of the inductive accumulator LSW is connected via the first capacitive accumulator CDC to the reference voltage terminal VSS.

The positive terminal of the second capacitive accumulator CFLY, marked in the illustration with a plus symbol, is coupled via the switch S31 to the supply voltage terminal VDD and via the switch S42 to the output terminal OUT. The other, negative, terminal of the second capacitive accumulator CFLY is coupled via the switch S41 to the first capacitive accumulator CDC and via the switch S32 to the reference voltage terminal VSS. The capacitive output accumulator COUT is again provided at the output terminal OUT.

Whereas the first and second switches S1, S2 can be ascribed to the step-down converter circuit DCDC, the switches S31, S32, S41, S42 are components of the charge pump circuit CP. The first and second intermediate voltages, as well as the output voltage as a combination of the first and second intermediate voltages, can be generated by corresponding control of the switches. The first intermediate voltage is regulated, for example, as a function of the voltage on the first capacitive accumulator CDC.

Figure 3:
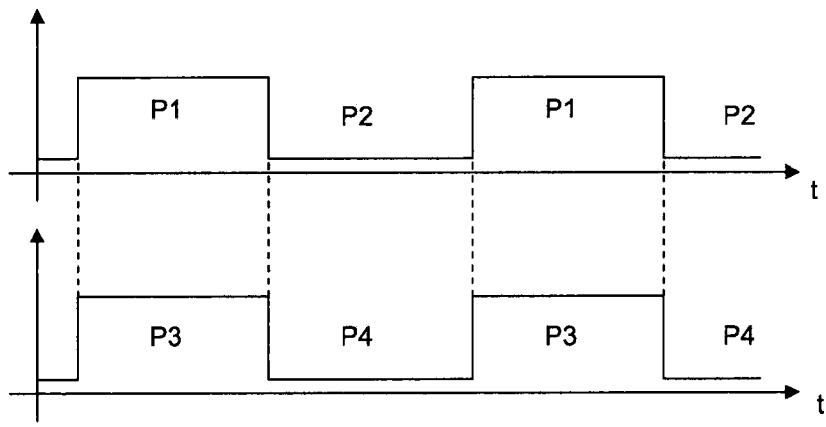
FIG. 3 shows a first example timing chart for sequences in the voltage converter.

The voltage converter circuit with the step-down converter DCDC and the charge pump circuit CP can be operated in different switching phases. FIG. 3 shows an example timing chart of switching phases P1, P2, P3, P4, in which the switches of the voltage converter are correspondingly controlled. A first switching phase P1 and a second switching phase P2, which alternate with one another, are shown in the upper half of the diagram. The first and second switching phases P1, P2 control the operation of the step-down converter circuit DCDC, in particular, that of the switches S1, S2. A third switching phase P3 and a fourth switching phase P4, which likewise alternate with one another, are shown in the lower half of the diagram. The third and fourth switching phases P3, P4 control the positions of the switches S31, S32, S41, S42.

In the example diagram of FIG. 3, first and third switching phases P1, P3 and second and the fourth switching phases P2, P4, respectively, coincide. This coincidence, however, is not mandatory and is used, among other things, for simpler explanation of the mode of operation of the voltage converter, which will now be described in connection with FIGS. 4A and 4B.

Figure 4A:
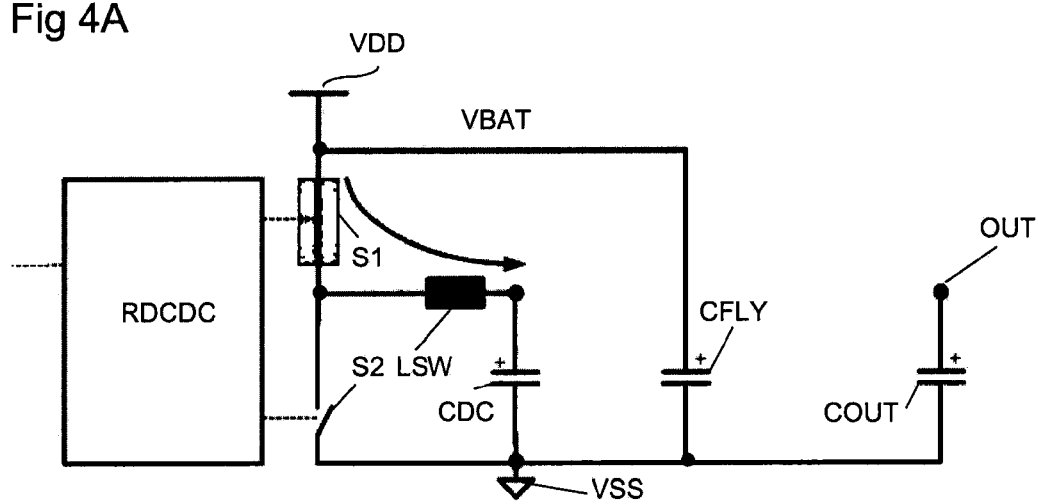
FIGS. 4A-4B shows example block diagrams during various switching phases of the voltage converter.

FIG. 4A shows a block schematic diagram of the voltage converter according to FIG. 2 during the first and third switching phase P1, P3. As a consequence of the first switching phase P1, the first switch S1 is in a closed position and the second switch S2 in an open position. Accordingly, a current can flow from the supply voltage terminal VDD via the first switch S1 through the inductive accumulator LSW to the first capacitive accumulator CDC, indicated by the corresponding current arrow in FIG. 4A. The current flow causes energy to be stored in the inductive capacitor LSW.

Referring to FIG. 2, the switches S31, S32 are in a closed state and the switches S41, S42 are in an open state in the third switching phase P3. The switches are not shown in FIGS. 4A and 4B for the sake of clarity. Accordingly, the positive terminal of the second capacitive accumulator CFLY is connected to the supply voltage terminal VDD, so that the second capacitive accumulator CFLY is charged to the supply voltage VBAT.

Figure 4B:
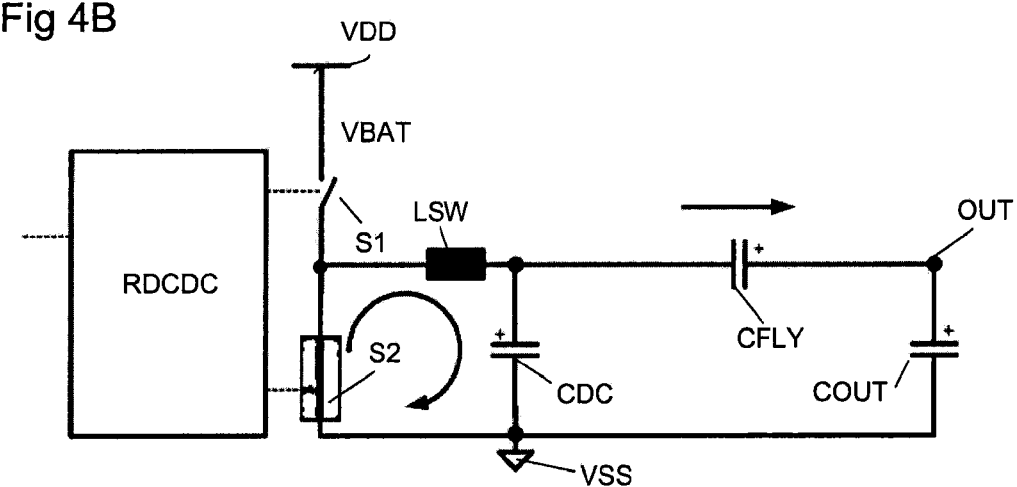

FIG. 4B shows the voltage converter as a block schematic diagram during the second and fourth switching phase P2, P4. As a consequence of the second switching phase P2, the first switch S1 is in an open state and the second switch S2 in a closed state. Since it is known that the current in the inductive accumulator LSW will keep on flowing, energy is transferred in the second switching phase P2 from the inductive accumulator LSW to the first capacitive accumulator CDC. The current flow via the inductive accumulator LSW, the first capacitive accumulator CDC and the second switch S2 is correspondingly illustrated by a current arrow in FIG. 4B.

Referring again to FIG. 2, the switches S31, S32 are in an open state, while the switches S41, S42 are in a closed state in the fourth switching phase P4. Thereby the positive terminal of the second capacitive accumulator CFLY is connected to the output terminal OUT, and the negative terminal to the connection node of the inductive accumulator LSW and the first capacitive accumulator CDC. Thus, the sum of the first intermediate voltage, which is present on the first capacitive accumulator CDC, and the second intermediate voltage, which is present on the second capacitive accumulator CFLY, results as the output voltage at the output terminal OUT on the output capacitive accumulator COUT. The second intermediate voltage corresponds to the supply voltage VBAT in this example embodiment.

The first intermediate voltage results in a known manner from a corresponding switching relationship between first and second switching phases P1, P2. The value of the first intermediate voltage thus can be adjusted essentially between zero and the supply voltage VBAT. The duration of the first and second switching phases P1, P2 is determined in this case by the control section RDCDC as a function of a control value that is supplied to the control section via a control input. Such a control input is shown for the sake of example on the left side of the control section RDCDC in FIGS. 4A and 4B.

Departing from the temporal sequence illustrated in FIG. 3, the first and second switching phases P1, P2 can in principle be selected independently of the third and fourth switching P3, P4 phases with respect to their switching duration and switching frequency. In other words, the control by the control section RDCDC in the step-down converter DCDC can be independent of a control of the charge pump circuit CP by the control section RCP.

Figure 5:
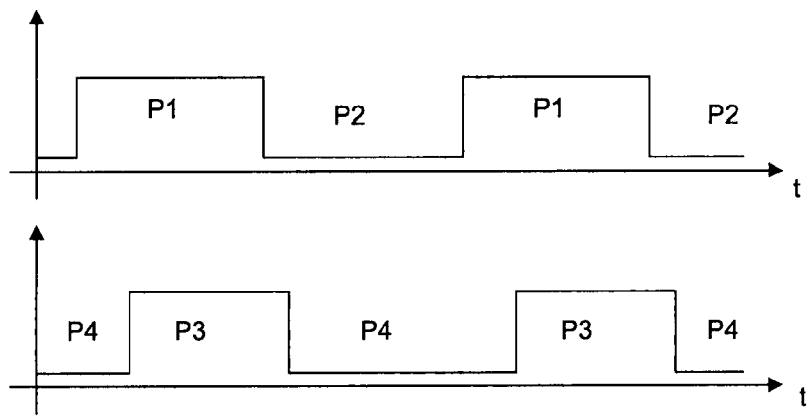
FIG. 5 shows a second example timing chart for sequences in the voltage converter.

FIG. 5 shows a corresponding timing chart in which the sequence between the first and second switch phases P1, P2 is independent of or not synchronized with the sequence of the third and fourth switching phases P3, P4. This is easily possible, because the first intermediate voltage is generated in the step-down converter circuit during the first and second switching phases P1, P2 via the first capacitive accumulator CDC, and can be tapped by means of the charge pump circuit CP to be increased by the second intermediate voltage, independently of the switching state of the first and second switches S1, S2. On the other hand, the charging process of the second capacitive accumulator CFLY during the third and fourth switching phases P3, P4 is also independent of the operation of the step-down converter circuit DCDC.

Figure 6:
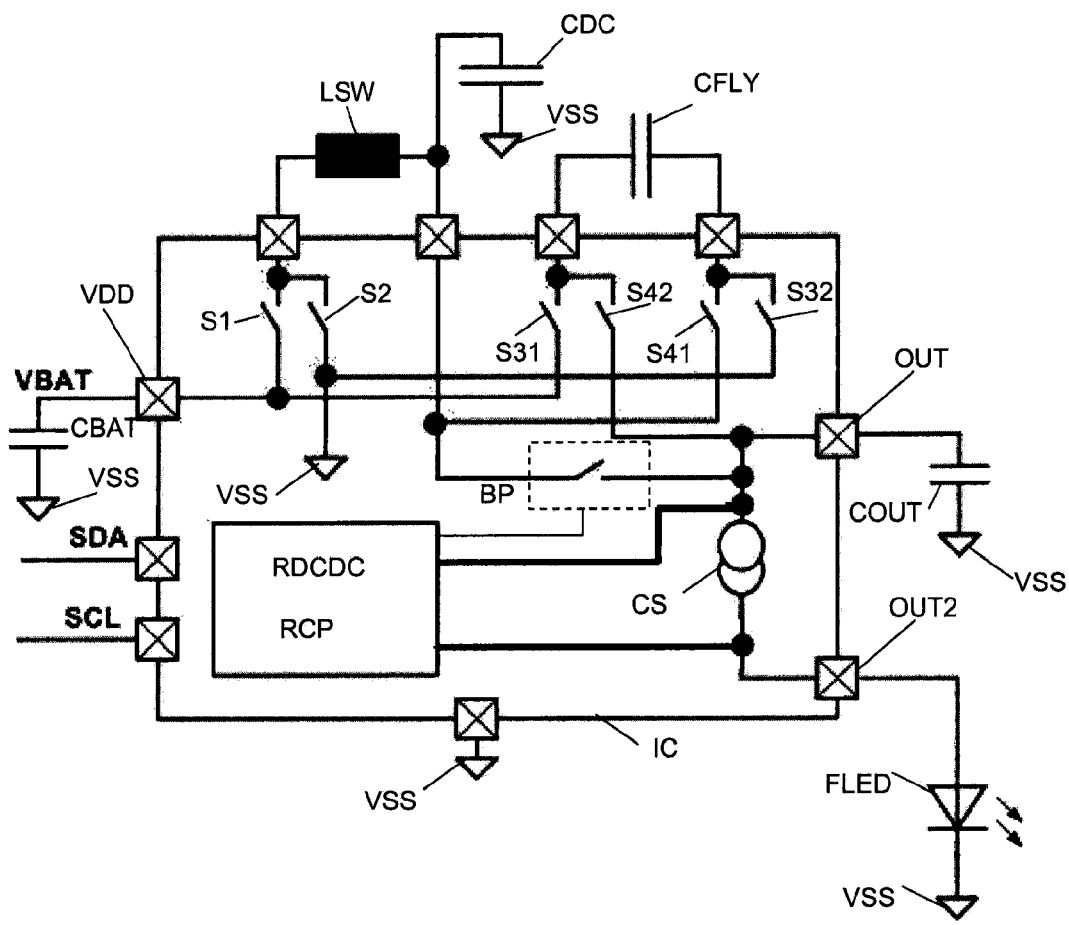
FIG. 6 shows a third example embodiment of a voltage converter.

FIG. 6 shows another example embodiment of a voltage converter, which essentially represents an expansion of the example embodiment illustrated in FIG. 2. The function of corresponding elements that are already known from FIG. 2 will therefore not be repeated at this point. Accordingly, control lines from the combined control section RDCDC, RCP for controlling the switches are again not shown for reasons of clarity, but are clear to the person skilled in the art without further explanation.

The voltage converter in FIG. 6 additionally comprises control inputs SDA, SCL, as well as a bridge circuit BP, which connects the connection node of the inductive accumulator LSW and the first capacitive accumulator CDC to the output terminal OUT. The bridge circuit BP comprises a switch, for example, and is coupled to the combined control section RDCDC, RCP to control said switch. The voltage converter further comprises a current source that connects the output terminal OUT to an additional output terminal OUT2, to which a flash lamp light-emitting diode FLED is connected as an example of an electrical load.

The bridge circuit BP is used to bridge the charge pump circuit CP, so that the first intermediate voltage is output as output voltage directly via the first capacitive accumulator CDC to the output terminal OUT. Accordingly, there is no increase of the first intermediate voltage by the second intermediate voltage from the charge pump circuit CP if the switch of the bridge circuit BP is closed. With such a voltage converter, it is therefore possible to provide output voltages lying in the range between zero and twice the supply voltage, wherein the bridge circuit is activated for desired output voltages in the range from zero to the supply voltage VBAT, and the bridge circuit BP is deactivated for desired output voltages between the supply voltage VBAT and twice the supply voltage. For this purpose, the combined control section RDCDC, RCP emits a corresponding control signal to the bridge circuit BP. A corresponding value for the desired output voltage can be supplied to the voltage converter via one of the control terminals SDA, SCL.

The output voltage at the output terminal OUT is supplied via the current source CS at a corresponding current level to the light-emitting diode FLED at the additional output terminal OUT2. A voltage drop across the current source CS is evaluated via corresponding terminals that are led into the control section RDCDC, in order to carry out a regulation of the first intermediate voltage. For example, the voltage drop across the current source CS is compared to a reference value that represents a measure of the desired level of the output voltage. The time durations of the first and second switching phases P1, P2 are adjusted as a function of the comparison. Alternatively or additionally, the voltage on the first capacitive accumulator CDC can also be evaluated to control the first intermediate voltage.

Figure 7A:
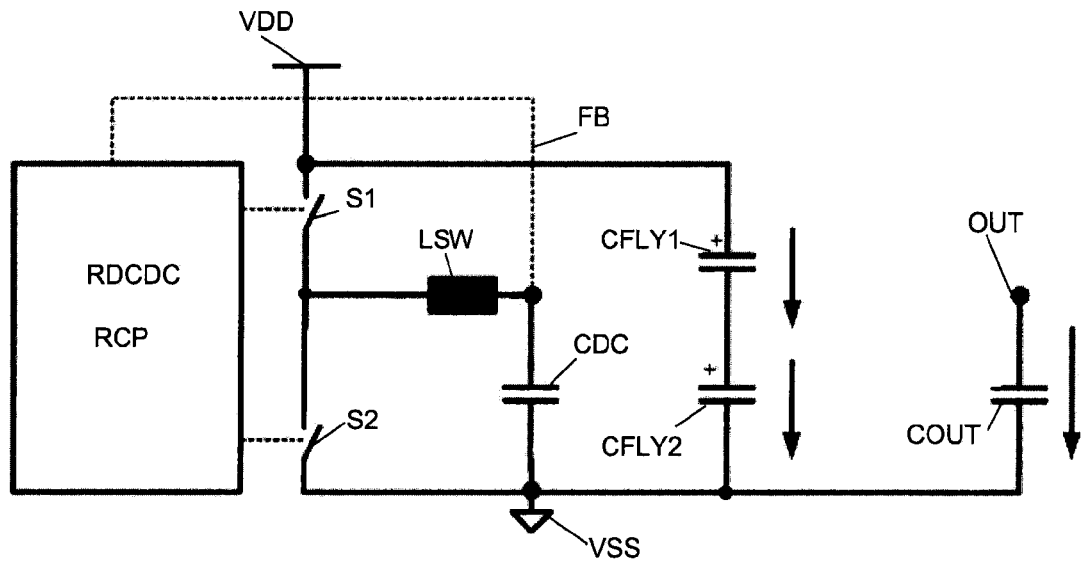
FIGS. 7A-7B show additional example block diagrams during various switching phases of the voltage converter.
Figure 7B:
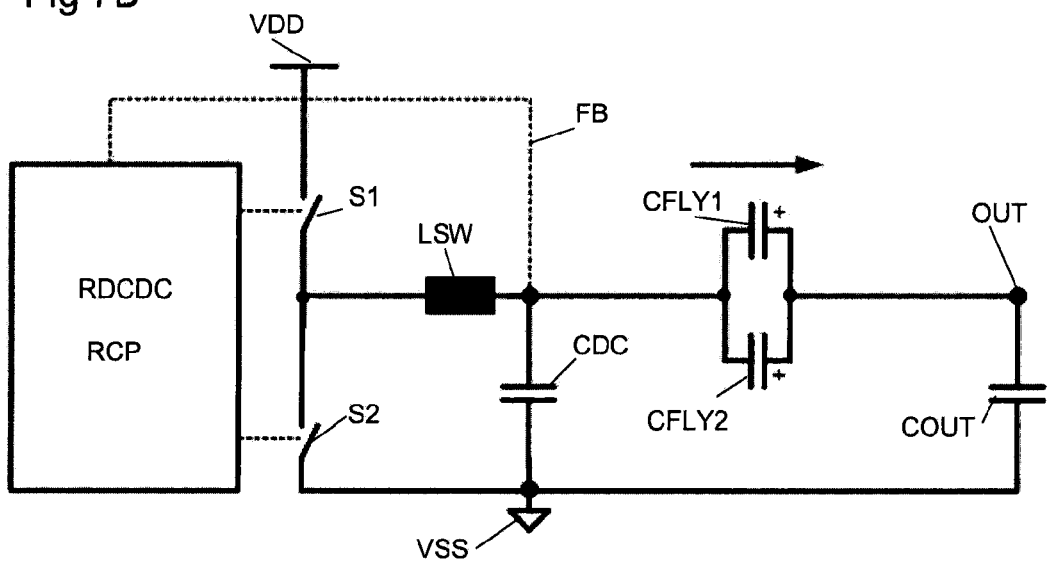

FIGS. 7A and 7B show block circuit diagrams of another embodiment of a voltage converter. The step-down converter circuit corresponds to the previously described embodiments in structure and function. The charge pump circuit CP, however, comprises a second and a third capacitive accumulator CFLY1, CFLY2, which have essentially the same capacitance. For example, the second and the third capacitive accumulators can be constructed as capacitors that are preferably identical in construction and have the same nominal capacitance value.

For reasons of clarity, the first and second switching phases P1, P2 for the step-down converter circuit DCDC are not shown in FIGS. 7A and 7B. FIG. 7A shows a connection of the second and third capacitive accumulators CFLY1, CFLY2 during the third switching phase. The second and third capacitive accumulators CFLY1, CFLY2 are connected in series between the supply voltage terminal VDD and the reference voltage terminal VSS. Thereby the individual capacitive accumulators are each charged to half the supply voltage in accordance with the principle of a capacitive voltage divider. Corresponding switches which enable this connection are not shown for reasons of clarity, but their positioning and control are easily derived by a person with ordinary skill in the art.

FIG. 7B shows the block circuit diagram during the fourth switching phase P4, in which the second and third capacitive accumulators CFLY1, CFLY2 are connected in parallel between the connection node of the inductive accumulator LSW with the first capacitive accumulator CDC and the output terminal OUT. The connection here is of such a type that the positive terminal of the capacitive accumulators CFLY1, CFLY2, marked with a plus sign, faces the output terminal OUT. Therefore there is again a superposition at the output terminal OUT of the second intermediate voltage, which is present on the capacitive accumulators CFLY1, CFLY2, and the first intermediate voltage on the capacitive accumulator CDC. Referring to FIG. 7A, the second intermediate voltage is half the supply voltage.

Under the assumption that first intermediate voltages in the range of zero to the supply voltage can be generated with the step-down converter circuit DCDC, an output voltage range of the voltage converter from half the supply voltage to one and one-half times the supply voltage results. With reference to the function of the bridge circuit BP in FIG. 6, the voltage range of the voltage converter in the example embodiment in FIG. 7 can be increased by a switchable connection between the first capacitive accumulator CDC and the output terminal OUT.

FIGS. 7A and 7B show a feedback line FB that feeds back the voltage on the first capacitive accumulator CDC to the control section RDCDC. Thus the first and second switching phases P1, P2 can be controlled by means of the switches S1, S2 as already described in order to be able to output a desired first intermediate voltage or a desired output voltage.

It may be noted that the embodiments described in the various figures can easily be combined. Further variations are also possible, for example, the provision of a larger number of charge accumulators in the charge pump circuit. In the third switching phase, three charge accumulators can be connected in series, while they are connected in parallel in the fourth switching phase. Accordingly, roughly one third of the supply voltage results as the second intermediate voltage. On the other hand, charge pump circuits that generate a second intermediate voltage that is higher than the supply voltage can also be used.

In the example embodiments described, a coil of smaller size than in conventional voltage converters can be used as the inductive accumulator LSW. Such a coil can be smaller and have a lower overall height than the coil in a conventional voltage converter, for example. The additionally required capacitive accumulators of the charge pump circuit ordinarily require less additional space than is saved by the reduction of the coil. Thus the overall size of a voltage converter can be advantageously reduced. With regard to production costs as well, the savings from the smaller coil markedly exceed the additional costs for the capacitive accumulator of the charge pump circuit. Therefore a voltage converter according to one of the prescribed embodiments not only saves space but is also more cost-effective to manufacture than a comparable conventional voltage converter.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A voltage converter, comprising:
   a step-down converter circuit that comprises an inductive accumulator and a first capacitive accumulator and is configured to charge the first capacitive accumulator to a first intermediate voltage in switched mode, wherein the step-down converter circuit is configured to be fed by a supply voltage on an input side; and
   a charge pump circuit that is configured to charge at least one second capacitive accumulator to a second intermediate voltage using the supply voltage and is configured to generate an output voltage from the first and second intermediate voltages,
   wherein the at least one second capacitive accumulator is connected via its positive terminal to the supply voltage such that the at least one second capacitive accumulator is charged directly by the supply voltage, and
   wherein, during at least one switching phase different from a switching phase in which the at least one second capacitive accumulator is charged directly by the supply voltage, the at least one second capacitive accumulator is connected via its negative terminal to a connection node of the inductive accumulator and the first capacitive accumulator.

2. The voltage converter according to claim 1, wherein the step-down converter circuit is configured to charge the inductive accumulator via the supply voltage in a first switching phase, and to transfer energy from the inductive accumulator to the first capacitive accumulator in a second switching phase, wherein the first and second switching phases alternate with one another.

3. The voltage converter according to claim 2, wherein the charge pump circuit is configured to charge the at least one second capacitive accumulator to the second intermediate voltage in a third switching phase, and to connect the first capacitive accumulator and the at least one second capacitive accumulator in series in a fourth switching phase, wherein the third and the fourth switching phases alternate with one another, and wherein the first and the third switching phase begin simultaneously or are offset with respect to their phase.

4. The voltage converter according to claim 1, wherein the charge pump circuit is configured to charge the at least one second capacitive accumulator to the second intermediate voltage in a third switching phase, and to connect the first capacitive accumulator and the at least one second capacitive accumulator in series in a fourth switching phase, wherein the third and the fourth switching phases alternate with one another.

5. The voltage converter according to claim 4, wherein the charge pump circuit is configured to charge the at least one second capacitive accumulator and a third capacitive accumulator, which have essentially the same capacitance, in a series circuit to the supply voltage in the third switching phase, and to connect the at least one second and the third capacitive accumulators, in a parallel circuit, in series with the first capacitive accumulator, in the fourth switching phase.

6. The voltage converter according to claim 1, wherein the charge pump circuit is configured to charge the at least one second capacitive accumulator to the supply voltage.

7. The voltage converter according to claim 1, wherein the charge pump circuit is configured to generate the second intermediate voltage with a value that is larger than the supply voltage.

8. The voltage converter according to claim 1, further comprising a bridge circuit that is configured to connect the first capacitive accumulator to an output terminal as a function of a control signal in such a manner that the first intermediate voltage is output at the output terminal as the output voltage.

9. The voltage converter according to claim 1, wherein the step-down converter circuit comprises a control section that is configured to control the switched mode in such a manner that the first intermediate voltage has a predetermined value.

10. The voltage converter according to claim 9, wherein a current source is provided on the output side to supply an electrical load, wherein the control section is configured to perform the control as a function of a voltage drop across the current source.

11. A method for voltage conversion, comprising:
   providing a step-down converter circuit having an inductive accumulator and a first capacitive accumulator;
   providing a charge pump circuit having at least one second capacitive accumulator;
   charging the first capacitive accumulator via the inductive accumulator to a first intermediate voltage with a supply voltage in switched mode;
   charging the at least one second capacitive accumulator to a second intermediate voltage with the supply voltage, wherein the at least one second capacitive accumulator is connected via its positive terminal to the supply voltage such that the at least one second capacitive accumulator is charged directly by the supply voltage;
   connecting, during at least one switching phase different from a switching phase in which the at least one second capacitive accumulator is charged directly by the supply voltage, the at least one second capacitive accumulator via its negative terminal to a connection node of the inductive accumulator and the first capacitive accumulator; and generating an output voltage as a function of the first and second intermediate voltages.

12. The method according to claim 11, wherein the inductive accumulator is charged via the supply voltage during charging of the first capacitive accumulator in a first switching phase, and energy is transferred in a second switching phase from the inductive accumulator to the first capacitive accumulator, wherein the first and second switching phases alternate with one another.

13. The method according to claim 11, wherein the at least one second capacitive accumulator is charged to the second intermediate voltage in a third switching phase and the first and the at least one second capacitive accumulators are connected in series in a fourth switching phase, wherein the third and the fourth switching phases alternate with one another.

14. The method according to claim 11, wherein either the first intermediate voltage or the sum of the first and second intermediate voltages is output as the output voltage, depending on a control signal.

15. The method according to claim 11, wherein the second intermediate voltage corresponds to the supply voltage.

\* \* \* \* \*